Nov. 1, 1938.  R. GUNN  2,134,716
MEASURING SPEED AND DISTANCE BY RADIANT ENERGY
Filed Oct. 20, 1936
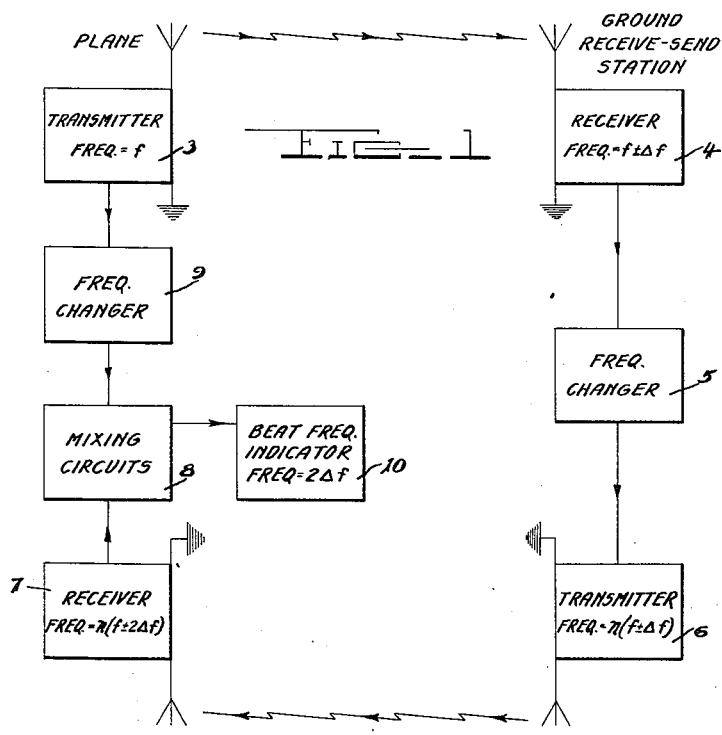
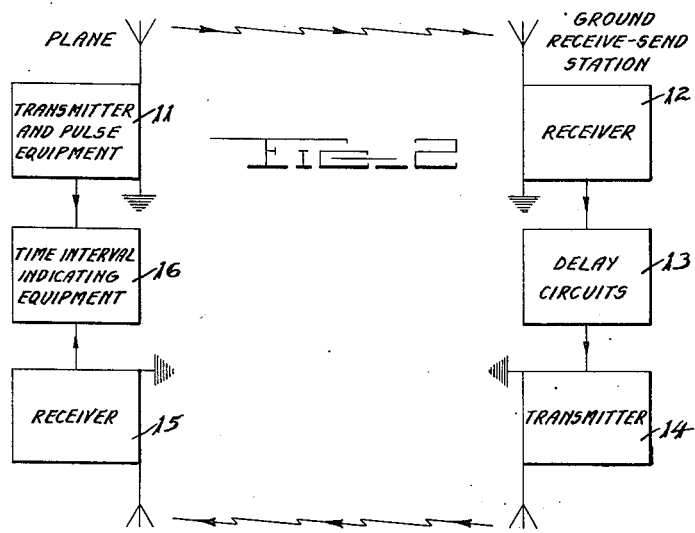
INVENTOR
Ross Gunn
BY
ATTORNEY Patented Nov. 1, 1938

2,134,716

UNITED STATES PATENT OFFICE 2,134,716

MEASURING SPEED AND DISTANCE BY RADIANT ENERGY

Ross Gunn, Washington, D. C.

Application October 20, 1936, Serial No. 106,539

10 Claims. (Cl. 250—2)

(Granted under the act of March 3, 1883, as amended April 30, 1928; 370 O. G. 757)

This invention relates to a method of and apparatus for measuring the ground speed of a continuously moving body, such as an aircraft or other moving vehicle, with respect to a selected point and also to measuring the distance from such moving body to the selected point.

It is an object of this invention to provide a method of using known apparatus in new combinations and associations for determining the ground speed of a moving body and particularly that of an airplane. It is a further object of this invention to utilize the Doppler effect to determine the time required for a radio wave to be transmitted from a moving body to a selected point and be received on such body after being retransmitted from the said point, and likewise to use the Doppler effect in determining the ground speed of the moving body. A still further object is to utilize a portion of the energy from the transmitter at the moving point to mix with the retransmitted energy to beat therewith. Another object is to impress a known time delay between the receipt of the transmitted energy at the selected point and its retransmittal to facilitate measurement of the time between the original transmittal and the reception of the energy back at the source of radiation.

In the drawing:

Fig. 1 represents schematically a system for practicing my invention wherein the frequency of the energy that is to be retransmitted is changed and a like change of frequency is made in energy taken directly from the source of radiation and which is then mixed with the received retransmitted energy;

Fig. 2 illustrates schematically a system for utilizing the principle of my invention when a delay is impressed between the receipt of the signal wave at the selected point and its retransmission therefrom.

It is the purpose of this invention to provide means whereby an aircraft flying above the clouds, or any other craft, may determine accurately its actual speed and distance with respect to a fixed point on the ground or with respect to a surface vessel like an aircraft carrier Such equipment is not now available.

The fundamental background of the invention may best be understood by considering first a simplified, but at the present time an impractical, method. Suppose that two radio transmitters are available that oscillate, for example at 1000 megacycles (wavelength 30 cm.) or any other suitable frequency, and suppose for the purpose of illustration that it is possible to make both oscillators continually oscillate at exactly this frequency. Suppose that one oscillator is connected to a transmitting antenna and the other oscillator is coupled to a receiving set on an airplane or other moving vehicle and the receiving set is adjusted to receive the wave from the first oscillator. It is well known that the movement of the plane will give rise to a Doppler change in frequency and the received oscillations will be at a slightly different frequency than the frequency transmitted or the frequency of the oscillator on the plane. By properly mixing the incoming and local oscillations in the well known manner, beats will be set up and the number of these beats per second will be a measure of the component of the ground speed toward or away from the transmitter. It is easy to show that the "beat frequency" and the ground speed are related by the following simple relation $$\frac{df}{f} = \frac{V \cos x}{C}$$

where $f$ is the frequency of the carrier wave, $df$ the frequency of the beats, V the speed of the plane with respect to the ground, C the velocity of propagation of the wave and $x$ is the angle that the line of flight of the plane makes with the radius vector drawn from the transmitting station to the plane. It is to be noted that V cos $x$ is the quantity measured and this is the component of the ground speed on the radius vector drawn from the transmitter to the plane. Thus a pilot adjusting the direction of flight so that the beat frequency is a maximum may be assured that his actual ground speed toward or away from the transmitter is a maximum.

The foregoing system is impractical at the present time, since no two oscillators can be made to oscillate at the same rate with the desired degree of stability. For useful results it is necessary that the oscillators be isochronous to one part in a thousand million. The best ones now available are not good to one part in a million. It therefore becomes necessary to devise means whereby the same result can be attained by one oscillator. The method of attaining the aforesaid results and the means whereby the method is practiced constitute the present invention.

The apparatus for actually measuring the ground speed may be either on the plane or at the ground. For convenience it will be assumed in the following discussion that the airplane pilot wishes to measure his ground speed and the apparatus is selected accordingly. On the plane, a radio transmitter 3 of suitable frequency is carried. This transmitter radiates a frequency $f$ which is picked up by the ground station comprising a receiver-amplifier 4, a frequency changer 5 connected to the output of receiver 4, and a transmitter 6 to reradiate the changed frequency. The frequency received by 4 will obviously be modified by the Doppler effect. The incoming radio frequency is amplified at the ground station and its frequency changed, solely to prevent interference of the received and transmitted signal. For example, the frequency may conveniently be tripled by employing well known methods. The tripled radio frequency $$3f\left(1+\frac{V}{C}\cos x\right)$$

is put on an antenna and the energy radiated. The airplane receiver 7 picks up this signal of triple frequency which is now modified by a Doppler change in frequency and the signal is fed into mixing circuits 8. Now on the plane a certain part of the transmitter frequency $f$ is fed into a frequency tripler 9, and the output of the tripler suitably coupled to the mixing circuits 8, whereof the output goes into a beat frequency indicator 10.

Therefore in the mixing circuits 8 on the plane two frequencies are present, namely $3f$ from the local oscillator and $$3f\left(1+\frac{V}{C}\cos x\right)^2$$

from the receiver-triple-transmit ground station. (The plane is assumed to be moving toward the ground station.) As is well known, the two signals will produce beats of a frequency equal to the difference of these frequencies or $$\frac{6fV\cos x}{C}+\frac{3fV^2}{C^2}\cos^2 x$$

Since the last term is negligible, the received beat frequency $df$ is given by $$df=\frac{6V\cos x}{C}$$

and the component of ground speed toward or away from the transmitter is $$V\cos x=\frac{C}{6}\frac{df}{f}$$

Now for any particular installation $$\frac{C}{6f}$$

is a constant and the ground speed is determined by indicating simply a low frequency.

There is nothing unusual about tripling the frequency. It could be doubled or quadrupled or even divided. In fact, it could be reflected at the same frequency if methods were specially devised to prevent interference of the receiver on the plane by its own transmitter. If the frequency is multiplied N times at the ground station, the ground speed is in general $$V\cos x=\frac{C}{2N}\frac{df}{f}$$

The above system may be slightly modified so that the distance of the receive-transmit station can be determined. Let the plane be a distance $S$ from the ground station; then the signals emitted from the plane transmitter will arrive back at the plane in a time $t=2S/C$. Now if the emitted frequency is increased (or decreased) uniformly, then the local signal frequency at any instant may be slightly different from that received, even though the Doppler frequency is zero. Thus by adjusting the time rate of change of frequency of the plane's transmitter to a definite value, it it possible to secure no beats whatsoever, even though the plane is moving toward the receive-transmit station. When the rate is adjusted for no beats, it is clear that the change in frequency of the oscillator in the interval between the emission of a wave and its reception back is just equal and opposite to the Doppler change; therefore $$df=\frac{2NfV\cos x}{C}=-\frac{df}{dt}t=-N\frac{df}{dt}\frac{2S}{C}$$

so that for zero beat, $$S=\frac{2V\cos x}{\frac{1}{f}\frac{df}{dt}}$$

Thus by first determining the ground speed by getting the beat frequency and hence $V\cos x$, and subsequently changing the oscillator frequency at a known rate such that no beats are produced, it is possible to determine the actual distance $S$ of the airplane from the ground station. It is evident that this procedure simply permits one to measure the time it takes the radio signal to go to the ground station and back.

The scope of my invention is not limited to the above very simple arrangement. In certain cases it may be impractical to employ special frequency changing equipment at the ground station and be very desirable to use ordinary radio transmitters operating on any arbitrary frequency. The fundamental idea underlying the invention may still be employed if the transmitted signal from the plane is modulated by a suitable oscillator. The modulated frequency is subjected to exactly the same fractional frequency shift by Doppler effects as is the carrier wave. The only practical difference being that since the modulating frequency is necessarily low compared to the carrier frequency, the actual change in frequency of the modulated signal is likely to be small. This difficulty, however, may be overcome in the following manner.

Let the carrier wave emitted from the plane be modulated at a frequency F. Suppose that an ordinary receiver on the ground station receives this signal, detects it, and applies the detected low frequency modulation to another transmitter operating on any other suitable carrier frequency. The plane picks up the latter carrier waves and by detection secures a frequency differing from the original modulation frequency by a slight amount corresponding to the Doppler change in frequency of $$F\left(1+\frac{V}{C}\cos x\right)^2$$

Now the difference between the local and the received modulating frequencies may be so small that one "beat" or cycle may require several minutes to complete. This situation does not keep the pilot from getting his ground speed, but it is inconvenient and slow, therefore undesirable. The inconvenience may be overcome by employing any kind of a device which will indicate the rate of change of phase between the local and the incoming modulation frequencies. The rate of change of phase between two nearby frequencies is clearly proportional to the difference in frequency so that the ground speed may readily be measured in terms of the rate of change of phase.

A receive-transmit station on the ground may be employed in another manner and the actual distance of the ground station from the plane determined with reasonable precision. By selecting different frequencies to which various receive-transmit stations are responsive, the distance to each may be found and triangulation is possible. The actual position of the plane at any point may therefore be determined, even though the pilot cannot see anything but clouds.

The distance of a plane from a given receive-transmit station may also be determined in the following manner. It is well known that radio waves travel with the velocity of light or 300,000 kilometers per second. Now if the plane's radio transmitter 11 (Fig. 2) is modulated by a pulse (or a series of them) and radiant energy emitted for a short time, then when that energy reaches the receiver 12 it will be passed through delay circuits 13, an energy of equal time duration will be retransmitted by transmitter 14 which may then be received back on the plane by receiver 15 and the time interval between its emission and reception measured by any one of several methods by passing the output of receiver 15 and a portion of the original frequency of transmitter 11 into time interval indicating means 16. The delay in circuits 13 provides a time interval that is greater than it would be otherwise and is therefore more readily measurable. It is obvious that an appropriate reduction in the time must be made to allow for the circuit lag in the receive-transmit station. This constant of any station is readily measured: call it $y$. Then the distance S of the receive-transmit station from the plane is $$S = \frac{C}{2}(t-y)$$

where C is the velocity of propagation, and $t$ is the measured time interval between the emission of the pulse and its reception back on the plane.

Several methods have been devised to measure short time intervals, principally by use of cathode ray tubes. See U. S. Patents Nos. 1,924,156, 1,924,174, 1,898,831 and 1,854,122. It, therefore, seems unnecessary to describe specific apparatus.

The method of sending out a pulse and measuring the time it takes to get back the re-emitted pulse from receive-transmit station is possibly the most practical since a single such station may serve a great number of ships and the technical difficulties to be overcome in preventing interference between the received and transmitted pulses are slight.

The pulse or time interval method offers further military advantage, since arbitrary and long delays, in addition to those inherently present in the apparatus, may be introduced at the receive-transmit station, for example aboard an aircraft carrier, and its apparent position shifted by any predetermined amount. The pilots in the aircraft based on such carrier would be provided with a different correction to be applied each day and they could return promptly while false information would be given to an enemy who happened to have the required apparatus and knew how to operate it. Further, the pulse method emits such irregular and short impulses that it would be extremely difficult to get compass bearings even if the device were operated at low frequencies. The super-frequencies could be used and would give further safety.

The most essential point of the above described invention is a receive-transmit station at some known point on the ground, its employment to reradiate effectively any signal having the characteristics of the transmitter on the moving plane, and beating the reradiated signal with a portion of the signal taken directly from the transmitter on the plane.

The invention herein described and claimed may be used and/or manufactured by or for the Government of the United States of America for governmental purposes without the payment of any royalties thereon or therefor.

I claim:

1. The method of determining the rate of relative movement along a line between a continuously moving body and an objective point, which comprises the steps of radiating from said moving body a wave train of known frequency and simultaneously changing in predetermined ratio the frequency of a portion of the energy from the source of said train, receiving said radiated train at said point, amplifying the received train and changing the frequency thereof in the same ratio as aforesaid, radiating from said point the said train with changed frequency, receiving at said moving body the train of changed frequency from said point, as modified by the Doppler effect, mixing said received modified train and said portion of energy of changed frequency and applying the resultant train to give an indication of the difference between the frequency of the modified train and that of the said portion of energy.

2. The method of determining the rate of relative movement along a line between a relatively moving body and an objective point and the distance between said body and said point, which comprises the steps of radiating from said moving body a wave train of known frequency and simultaneously changing in a predetermined ratio the frequency of a portion of the energy from the source of said train, receiving said radiated train at said point, amplifying the received train and changing the frequency thereof in the same ratio as aforesaid, radiating from said point the said train with changed frequency, receiving at said moving body the train of changed frequency from said point as modified by the Doppler effect, mixing said received modified train and said portion of energy of changed frequency, applying the resultant train to give an indication of the difference between the frequency of the modified train and that of the said portion of energy, said frequency difference being a function of said rate wherefrom said rate may be determined, then varying uniformly the frequency of the train transmitted from said body until the said received modified train does not beat with the said portion, said variation of frequency being a function of said distance wherefrom said distance may be determined.

3. The method of determining the rate of relative movement along a line between a relatively moving body and an objective point and the distance between said body and said point, which comprises the steps of radiating from said moving body a wave train of known frequency and simultaneously changing in a predetermined ratio the frequency of a portion of the energy from the source of said train, receiving said radiated train at said point, changing the frequency of said received train in the same ratio as aforesaid, radiating from said point the said train with changed frequency, receiving at said moving body the train of changed frequency from said point as modified by the Doppler effect, mixing said received modified train and said portion of energy of changed frequency applying the resultant train to give an indication of the difference between the frequency of the modified train and that of the said portion of energy, said frequency difference being a function of said rate wherefrom said rate may be determined, then varying uniformly the frequency of the train transmitted from said body until the said received modified train does not beat with the said portion, said variation of frequency being a function of said distance wherefrom said distance may be determined.

4. The method of determining the rate of relative movement along a line between a continuously moving body and an objective point, which comprises the steps of radiating from said moving body a wave train of known frequency, receiving said radiated train at said point, amplifying the received train, radiating from the said point the said amplified train, receiving at said body the train radiated from said point, as modified by the Doppler effect, mixing the said modified train and a portion of the energy from the source at said body, and applying the resultant train to give an indication of the difference of frequency of the modified train and that of the said portion of energy.

5. The method of determining the rate of relative movement along a line between a continuously moving body and an objective point, which comprises the steps of radiating from said moving body a wave train of known frequency, receiving said radiated train at said point, radiating from the said point the said train, receiving at said body the train radiated from said point, as modified by the Doppler effect, mixing the said modified train and a portion of the energy from the source at said body, and applying the resultant train to give an indication of the difference of frequency of the modified train and that of the said portion of energy.

6. The method of determining the distance between a continuously moving body and an objective point, which comprises the steps of radiating from said body a wave train of known frequency, receiving said train at said point, radiating said received train from said point, receiving at said body the train radiated from said point as modified by the Doppler effect, mixing the received modified train with a portion of the energy from the source at said body, and continuously varying the frequency of the train radiated from said body at such rate that the said received modified train does not beat with said portion when mixed therewith.

7. Apparatus of the class described, comprising a movable source of radio waves, a receiver at a selected point to receive waves transmitted from said source, frequency changing means connected to the output of said receiver, transmitting means connected to the output of said frequency changing means, receiving means at the position of said source to receive the said retransmitted energy, means connected to receive energy directly from said source and effect therein the same change in frequency as in the said frequency changing means, means to mix the output of said receiving means and the said means to receive energy directly from said source, and means to measure the difference in frequency between the two outputs thus mixed.

8. Apparatus of the class described, comprising a movable source of radio waves, a receiver at a selected point to receive waves transmitted from said source, means at said point to retransmit the energy so received, delay means to impress a delay upon said energy between the reception and the retransmission thereof, receiving means at the position of said source to receive said retransmitted energy and means operatively associated with said receiving means and said source to indicate the time interval between the original transmission of a signal wave and the receipt thereof at said receiving means.

9. The method of directing a moving body to an objective point, which comprises the steps of radiating from said moving body a wave train of known frequency and simultaneously changing in a pre-determined ratio the frequency of a portion of the energy from the source of said train, receiving said radiated train at said point, changing the frequency of said received train in the same ratio as aforesaid, radiating from said point the said train with changed frequency, receiving at said moving body the train of changed frequency at said point, as modified by the Doppler effect, mixing said received modified train and said portion of energy of changed frequency to cause beats and directing the movement of said body along the course where the number of such beats per unit of time is a maximum.

10. The method of directing a moving body to an objective point, which comprises the steps of radiating from said moving body a wave train of known frequency, receiving said radiated train at said point, radiating the said train from said point, receiving at said moving body the train radiated from said point, as modified by the Doppler effect, mixing said received train and a portion of energy from the source of radiation on said body to cause beats, and directing the movement of said body along the course where the number of beats per unit of time is a maximum.

ROSS GUNN.